(12) United States Patent
Campbell et al.

(10) Patent No.: US 11,390,726 B2
(45) Date of Patent: Jul. 19, 2022

(54) METHOD OF BONDING PERFLUOROELASTOMERIC MATERIALS TO A SURFACE

(71) Applicant: Greene, Tweed Technologies, Inc., Wilmington, DE (US)

(72) Inventors: Ronald R. Campbell, Harleysville, PA (US); Christopher Corrado, Hatfield, PA (US); Brian Alan Ux, Red Hill, PA (US); Robert Anthony Rey, Schwenksville, PA (US); Gary Reichl, Coopersville, PA (US); Carmin Quartapella, Schwenksville, PA (US)

(73) Assignee: Greene, Tweed Technologies, Inc., Wilmington, DE (US)

( * ) Notice: Subject to any disclaimer, the term of this patent is extended or adjusted under 35 U.S.C. 154(b) by 0 days.

(21) Appl. No.: 17/196,648

(22) Filed: Mar. 9, 2021

(65) Prior Publication Data
US 2021/0198447 A1 Jul. 1, 2021

Related U.S. Application Data

(63) Continuation of application No. 14/184,809, filed on Feb. 20, 2014, now Pat. No. 10,961,369, which is a
(Continued)

(51) Int. Cl.
*C08J 5/18* (2006.01)
*C08K 3/36* (2006.01)
(Continued)

(52) U.S. Cl.
CPC .............. *C08K 3/36* (2013.01); *B29C 65/485* (2013.01); *B29C 65/4835* (2013.01);
(Continued)

(58) Field of Classification Search
CPC .... C08J 5/18; C08J 3/242; C08K 5/33; C08K 5/29; C08F 214/184; C08F 214/282; C08F 214/262
See application file for complete search history.

(56) References Cited

U.S. PATENT DOCUMENTS 3,878,362 A   4/1975  Stinger
3,946,136 A   3/1976  Fitz et al.
(Continued)

FOREIGN PATENT DOCUMENTS

EP   0303244 A2   2/1989
EP   0399543 A2   11/1990
(Continued)

OTHER PUBLICATIONS

International Plastics Handbook, p. 54-55 published 1995.
(Continued)

*Primary Examiner* — Robert C Boyle
(74) *Attorney, Agent, or Firm* — Calderone Bullock LLC (57) ABSTRACT

The invention includes a method of bonding a perfluoroelastomer material to first surface that includes: (a) contacting a first surface with a bonding agent comprising a curable perfluoropolymer and a curing agent; (b) curing the bonding agent to form a perfluoroelastomer material that is bonded to the first surface. In the practice of such method, the bonding agent may be a solution prepared by dissolving the curable perfluoroelastomer and the curing agent in a solvent. In an embodiment of the invention, the perfluoroelastomer material formed in step (b) is a coating layer or, alternatively, the first surface is a surface of a perfluoroelastomer member and the perfluoroelastomer material formed is a perfluoroelastomer weld.

12 Claims, 7 Drawing Sheets

Related U.S. Application Data continuation of application No. 11/970,892, filed on Jan. 8, 2008, now abandoned.

(60) Provisional application No. 60/897,651, filed on Jan. 26, 2007, provisional application No. 60/897,660, filed on Jan. 26, 2007.

(51) Int. Cl.

| | | |
|---|---|---|
| *C08F 8/30* | (2006.01) | |
| *B29C 65/48* | (2006.01) | |
| *B29C 65/00* | (2006.01) | |
| *C08J 5/12* | (2006.01) | |
| *B29C 65/78* | (2006.01) | |
| *C09J 127/20* | (2006.01) | |
| *C09J 171/00* | (2006.01) | |
| *B29C 65/52* | (2006.01) | |
| *B29C 65/14* | (2006.01) | |
| *B29K 305/02* | (2006.01) | |
| *B29K 27/18* | (2006.01) | |
| *B29K 19/00* | (2006.01) | |
| *B29K 305/12* | (2006.01) | |
| *B29L 31/06* | (2006.01) | |
| *B29K 27/12* | (2006.01) | |
| *B29L 31/26* | (2006.01) | |
| *B29L 31/00* | (2006.01) | |
| *B29C 65/50* | (2006.01) | |
| *B29C 35/02* | (2006.01) | |
| *C08K 5/14* | (2006.01) | |

(52) U.S. Cl.
CPC ...... *B29C 65/7841* (2013.01); *B29C 66/1142* (2013.01); *B29C 66/5261* (2013.01); *B29C 66/71* (2013.01); *B29C 66/742* (2013.01); *C08F 8/30* (2013.01); *C08J 5/12* (2013.01); *C09J 127/20* (2013.01); *C09J 171/00* (2013.01); *B29C 35/02* (2013.01); *B29C 65/14* (2013.01); *B29C 65/1406* (2013.01); *B29C 65/1412* (2013.01); *B29C 65/5057* (2013.01); *B29C 65/52* (2013.01); *B29C 65/522* (2013.01); *B29C 65/523* (2013.01); *B29C 65/526* (2013.01); *B29C 66/5268* (2013.01); *B29K 2019/00* (2013.01); *B29K 2027/12* (2013.01); *B29K 2027/18* (2013.01); *B29K 2305/02* (2013.01); *B29K 2305/12* (2013.01); *B29K 2995/0058* (2013.01); *B29L 2031/06* (2013.01); *B29L 2031/26* (2013.01); *B29L 2031/7096* (2013.01); *C08J 2315/02* (2013.01); *C08K 5/14* (2013.01)

(56) References Cited

U.S. PATENT DOCUMENTS

| | | | |
|---|---|---|---|
| 4,191,386 A | 3/1980 | Hershey | |
| 4,931,511 A * | 6/1990 | Kawachi | C08J 3/091 |
| | | | 525/326.3 |
| 4,983,680 A | 1/1991 | Ojakaar | |
| 4,983,697 A | 1/1991 | Logothetis | |
| 5,001,278 A | 3/1991 | Oka et al. | |
| 5,001,287 A | 3/1991 | Fernandez et al. | |
| 5,008,340 A | 4/1991 | Guerra et al. | |
| 5,252,401 A | 10/1993 | Kitto et al. | |
| 5,256,747 A | 10/1993 | Ojakaar et al. | |
| 5,268,002 A | 12/1993 | Olson et al. | |
| 5,444,116 A | 8/1995 | Amin et al. | |
| 5,445,327 A | 8/1995 | Creehan | |
| 5,696,189 A | 12/1997 | Legare | |
| 5,945,223 A | 8/1999 | Kuntz et al. | |
| 6,203,912 B1 | 3/2001 | Watakabe et al. | |
| 6,523,650 B1 | 2/2003 | Pribonic et al. | |
| 6,846,880 B2 * | 1/2005 | Grootaert | C08K 5/29 |
| | | | 525/259 |
| 2003/0157336 A1 * | 8/2003 | Kinoshita | C09D 127/12 |
| | | | 428/421 |
| 2003/0162022 A1 | 8/2003 | Jing et al. | |
| 2003/0176516 A1 | 9/2003 | Underwood et al. | |
| 2004/0068036 A1 | 4/2004 | Halladay et al. | |
| 2004/0069403 A1 | 4/2004 | Jing et al. | |
| 2004/0214956 A1 * | 10/2004 | Aufdermarsh | C08K 5/16 |
| | | | 525/326.2 |
| 2005/0171257 A1 | 8/2005 | Wakui | |
| 2005/0215726 A1 | 9/2005 | Kuboyama | |
| 2006/0110601 A1 | 5/2006 | Hennessey | |
| 2006/0287438 A1 | 12/2006 | Mansfield et al. | |
| 2007/0004862 A1 | 1/2007 | Park et al. | |

FOREIGN PATENT DOCUMENTS

| | | |
|---|---|---|
| JP | S62263272 A | 11/1987 |
| JP | H0372552 A | 3/1991 |
| JP | H07507589 A | 8/1995 |
| JP | H02222438 A | 9/1995 |
| JP | H10245535 A | 9/1998 |
| JP | H10310738 A | 11/1998 |
| JP | H11102905 A | 4/1999 |
| JP | 2001/064465 A | 3/2001 |
| JP | 2005-220161 A | 8/2005 |
| JP | 2010/516864 A | 5/2010 |
| WO | 2000/008076 A1 | 2/2000 |
| WO | 2003/076535 A1 | 9/2003 |
| WO | 2005/049746 A1 | 6/2005 |
| WO | 2005/097890 A2 | 10/2005 |
| WO | 2006/028906 A1 | 3/2006 |
| WO | 2006/078425 A2 | 7/2006 |

OTHER PUBLICATIONS

Wang, Perfluoroelastomer and fluoroelastomer seals for semiconductor wafer processing equipment, J. Fluorine Chem., 122 (2003) p. 113-119.

\* cited by examiner

PLACING A BONDING AGENT HAVING A CURABLE PERFLUOROPOLYMER AND A CURING AGENT WITHIN A GAP BETWEEN A PERFLUOROELASTOMER SEAL AND GLAND

CURING THE BONDING AGENT TO BOND THE SEAL TO THE GLAND

METHOD OF BONDING PERFLUOROELASTOMERIC MATERIALS TO A SURFACE

CROSS REFERENCE TO RELATED APPLICATIONS

This application is a continuation of pending: U.S. patent application Ser. No. 14/184,809, filed Feb. 20, 2014, and entitled "Method of Bonding Perfluoroelastomeric Materials to a Surface", which itself is a continuation of U.S. patent application Ser. No. 11/970,892, filed Jan. 8, 2008, entitled "Method of Bonding Perfluoroelastomeric Materials to a Surface", which in turn claims the benefit of priority under 35 U.S.C. § 119(e) to each of U.S. Provisional Patent Application Nos. 60/897,660 and 60/897,651, both filed Jan. 26, 2007, the contents of each of which are incorporated herein by reference.

BACKGROUND OF THE INVENTION

Perfluoroelastomers have readily been used to form various types of O-rings or seals. Such seals are commonly manufactured by first producing a complete mold for the seal in the desired seal configuration and then compression molding a compound that includes perfluoropolymers along with curing agents to form a completely cured perfluoroelastomer seal or other part. However, with the ever-increasing need for larger and larger seals or unusual configurations, molding complete parts becomes more and more expensive and less of an economical practicality. This is because to form such parts requires not only the molds but also an infrastructure sufficient to handle the large or unusually sized molds, including presses and pumps related to molding operations.

One approach developed to address this need has been to produce seals from rod stock and splice the two rod stock ends together to form the required size seal. Traditional splicing techniques have not proven very successful with perfluoroelastomers. Splicing with an adhesive provides a weak point in the seal that is prone to attack because adhesives developed in the past generally do not match the chemical resistance of perfluoroelastomers.

Methods of bonding a cured perfluoroelastomer to itself using a thermoplastic perfluoropolymer bonding agent have been disclosed. However, such processes result in fusing of the perfluoroelastomer ends leading to an intermediate fusing layer i.e., a layer of fused perfluoropolymer. This provides a non-homogenous section within the perfluoroelastomer part i.e., the fused perfluoropolymer layer. Thus, the fused perfluoropolymer could result in a "weak" point due to increased susceptibility to chemical or physical attack, increased compression set and reduced low temperature compliance than the rest of the perfluoroelastomer seal material. There is, therefore, a need in the art for an improved method of bonding and/or welding perfluoroelastomers and parts formed from them that is simple and economical and provides for a homogenous finished part that substantially retains the strength of a solid finished piece.

In addition to the challenges associated with joining perfluoroelastomer surfaces, it is noted that perfluoroelastomers, by virtue of the manner in which they are typically cured and formed as noted above, and their unique vulcanization properties (included physical and solubility properties) have not, however, been successfully adopted for certain uses and applications in which their chemical resistance and elastomeric properties would otherwise be advantageous, such as in surface passivation or other coating use.

Whereas attempts have been made to dissolve curable perfluoropolymers in fluorinated solvents, such as, Fluorinert® FC-40, FC-75 and FC-77 to try to prepare coatings, the resulting coatings are typically not resistant to flow or to certain solvents, because the coatings were not cross-linked. Attempts to incorporate curatives, such as, organic peroxides with associated co-curatives; such as, triallyl isocyanurate (TAIC), were unsuccessful due to the poor solubility of such hydrocarbon-containing curatives in the highly fluorinated solvents needed to dissolve the uncured perfluoropolymer. Likewise, bisphenyl-based curatives, such as bisaminophenol (BOAP) typically also exhibit poor solubility in such highly fluorinated solvents needed to dissolve perfluoropolymers curable with BOAP such as those with cyano-group containing curesite monomers.

This lack of the ability to cure high molecular weight curable perfluoropolymers in solution has restricted the use of perfluoroelastomer coatings to non-critical applications where "flow" of the uncured material is acceptable.

Attempts have been made to form perfluoroelastomer coatings in the past, however, the uses and particular perfluoropolymer systems formed into coatings are limited. U.S. Pat. No. 6,523,650 provides one example of use of a perfluoroelastomer coating on an electrostatic printing component as an outer coating. The patent describes dissolving an elastomeric DuPont Kalrez® perfluoroelastomer, derived from 3-phenoxypropylvinyl ether and at least one fluorine-containing ethylenically unsaturated monomer, in solvent and applying it as a coating. However, the patent does not describe whether the perfluoroelastomer is in a cured state upon dissolution and/or how the cure system is affected by dissolution.

U.S. Pat. No. 5,268,002 teaches coating of pellicles for photomask applications with a coating formed of a low molecular perfluoroelastomer polymer that acts as an anti-reflective coat for the pellicles. Such pellicles have a core layer of a polymer, such as nitrocellulose, among others. The perfluoroelastomer polymers include tetrafluoroethylene (TFE), perfluoroalkylvinyl ether (PAVE) and a curesite monomer such as perfluoro-(8-cyano-5-methyl-3,6-dioxa-1-octene) (8-CNVE). The patent uses such polymers to form low molecular weight perfluoroelastomers having these components by pyrolyzing the elastomer noted above and then dissolving the low molecular weight polymer in a fluorocarbon solvent such as Fluorinert® FC-40, Fluorinert® FC-75 or Fluorinert® FC-77. The pyrolysis enhances the solubility to enable the resulting materials to be used in coating form. See also, U.S. Pat. No. 5,256,747.

Moreover, there is a need in the art for an easy-to-form surface coating that can incorporate the advantages of a standard perfluoroelastomeric coating (as opposed to a low molecular weight coating), including allowing for use of a standard cure system and final cured perfluoroelastomer compound without complex process steps, while maintaining desired coating properties suitable for use on process equipment and the like and a process for preparing the same. The invention disclosed herein addresses this need and the need for a method of perfluoroelastomer joining or splicing disclosed above.

BRIEF SUMMARY OF THE INVENTION

Included within the several embodiments of the invention is a method of bonding a perfluoroelastomer material to first surface that includes: (a) contacting a first surface with a bonding agent comprising a curable perfluoropolymer and a curing agent; and (b) curing the bonding agent to form a perfluoroelastomer material that is bonded to the first surface. In the practice of such method, the bonding agent may be a solution prepared by dissolving the curable perfluoroelastomer and the curing agent in a solvent. In an embodiment of the invention, the perfluoroelastomer material formed in step (b) is a coating layer or, alternatively, the first surface is a surface of a perfluoroelastomer member and the perfluoroelastomer material formed is a perfluoroelastomer weld.

In one embodiment of the method, the first surface is a surface of a perfluoroelastomer member, the bonding agent is also contacted to a second surface and step (c) further includes curing the bonding agent to form a perfluoroelastomer weld between the first surface and the second surface. Upon curing, the perfluoroelastomer weld includes essentially the same perfluoroelastomer as the perfluoroelastomer member.

An embodiment of the invention also includes method of forming a perfluoroelastomer coating that includes: (a) dissolving a curable perfluoropolymer and a curing agent in a solvent to form a solution, (b) applying the solution to a surface; and (c) curing the perfluoropolymer to form a cured perfluoroelastomeric coating on the surface. Additionally, coated substrates including a cured perfluoroelastomer coating applied on at least one surface of the substrate are also within the scope of the invention.

In another embodiment of the invention a method of bonding a perfluoroelastomer member to a surface is disclosed. The method includes (a) contacting a first surface of a perfluoroelastomer member with a bonding agent comprising: a curable perfluoropolymer, and a curing agent; (b) placing the bonding agent also in contact with a second surface; and (c) curing the bonding agent to form a perfluoroelastomer weld between the first and second surface, wherein upon curing the perfluoroelastomer weld comprises essentially the same perfluoroelastomer as the perfluoroelastomer member.

In another embodiment, a method of bonding a perfluoroelastomer seal to a gland is disclosed and includes placing a bonding agent comprising a curable perfluoropolymer and curing agent within gaps formed between a perfluoroelastomer seal and a gland; and curing the bonding agent; wherein upon curing, the perfluoropolymer forms essentially the same perfluoroelastomer as the perfluoroelastomer seal.

BRIEF DESCRIPTION OF THE SEVERAL VIEWS OF THE DRAWINGS

FIGS. 3a and 3b are perspective views of a conventional rod stock material;

FIG. 4 is a perspective view of an embodiment of a splicing fixture of the present invention;

FIG. 4a is a partial, enlarged, exploded side elevational view of the rod stock material in FIG. 3a;

DETAILED DESCRIPTION OF THE INVENTION

Described herein are methods of bonding a perfluoroelastomer material to first surface and, optionally, a second surface. Also included are articles, such as seals and coated substrates that are made using the methods. A perfluoroelastomer material, as used herein, may be any cured elastomeric material derived by curing a perfluoroelastomer (as defined herein) that includes a curable perfluoropolymer having a crosslinking group to permit cure. A perfluoroelastomer is substantially fluorinated, and preferably completely fluorinated with respect to the carbon atoms on the backbone of the perfluoropolymer. It will be understood that some residual hydrogen may be present in perfluoroelastomers within the crosslinks due to use of hydrogen in the functional crosslinking group in some perfluoroelastomer formulations. In general, perfluoroelastomers, once cured are used, for example, as cross-linked polymeric formed articles such as seals.

The perfluoropolymers used to form perfluoroelastomer material upon cure are themselves formed by polymerizing one or more perfluorinated monomers, one of which is preferably a perfluorinated curesite monomer having a functional group to permit curing.

As used herein, a perfluoroelastomer is a polymeric composition that includes a curable perfluoropolymer formed by polymerizing two or more perfluorinated monomers, including at least one perfluorinated monomer that has at least one functional group to permit curing i.e., at least one curesite monomer. Such perfluoroelastomer can include two or more of various perfluorinated copolymers of at least one fluorine-containing ethylenically unsaturated monomer, such as tetrafluoroethylene (TFE), a perfluorinated olefin, such as hexafluoropropylene (HFP), and a perfluoroalkyl-vinyl ether (PAVE) which includes alkyl groups that are straight or branched and which include one or more ether linkages, such as perfluoro(methyl vinyl ether), perfluoro (ethyl vinyl ether), perfluoro(propyl vinyl ether) and similar compounds. Useful examples of PAVEs include those described in U.S. Pat. No. 5,001,278, and in WO 00/08076, of which the disclosures related to types of PAVEs are herein incorporated by reference. Other suitable PAVEs are described, for example, in U.S. Pat. Nos. 5,696,189 and 4,983,697, of which the disclosures related to types of PAVEs are also herein incorporated by reference.

Preferred perfluoropolymers are those which meet the industry accepted definition of a perfluoroelastomer listed as an FFKM in ASTM D-1418-05 and, are also preferably terpolymers or tetrapolymers of TFE, PAVE, and at least one perfluorinated cure site monomer which incorporates a functional group to permit crosslinking of the terpolymer, at least one of which is a curesite capable of being cured by the curatives described herein.

Preferred perfluoroelastomer polymers for use in the present invention are either commercially available as curable perfluoropolymers or are known to be manufactured and/or sold by Daikin Industries, Inc., Solvay Solexis, Dyneon, E.I. Du Pont de Nemours, Inc., Federal State Unitary Enterprise S.V. Lebedev Institute of Synthetic Rubber in Russia, and Nippon Mektron in Japan.

In an embodiment, the invention includes perfluoroelastomer materials that are perfluoroelastomer coatings, and methods of manufacturing such coatings, and perfluoroelastomer materials that are welds acting to connect or splice a first surface to a second surface.

Embodiments including these are formed, in part, by cure of a perfluoroelastomer by a curing agent. Preferred are peroxide-curable systems as well as cyano-curable systems. With regard to peroxide-curable systems, preferred polymers include terpolymers of TFE, PAVEs such as those described in U.S. Pat. No. 5,001,278 (incorporated herein in relevant part reference), and a curesite monomer having a perfluorinated structure with a peroxide-curable functional group including those known or to be developed in the art, such as halogenated alkyl and other derivatives, and partially- or fully-halogenated hydrocarbon groups.

Regarding cyano-curable systems, most preferred are perfluoropolymers as described in WO 00/08076, incorporated herein by reference or other similar structures. The monomers in the tetrapolymer of WO 00/08076 include tetrafluoroethylene, perfluoromethylvinyl ether and two curesite monomers, a secondary cyano curesite monomer, $CF_2$=$CFO(CF_2)_3OCF(CF_3)CN$ and a primary cyano curesite monomer, $CF_2$=$CFOCF_2CF(CF_3)O(CF_2)_2CN$. Preferred compounds are those having a Mooney viscosity (measured at 100° C. on a TechPro® viscTECH TPD-1585 viscometer) of about 45 to about 95, and preferably of about 45 to about 65.

Primary curing agents for are peroxide-based cure systems may be any known peroxide curing and co-curing agents known or to be developed in the art, such as organic and dialkyl peroxides. For the cyano-based polymers, preferred primary curing agents include monoamidines and monoamidoximes as described as U.S. Patent Publication No. US-2004-0214956-A1, the disclosure of which is incorporated herein by reference in relevant part. While such monoamidines and monoamidoximes are described as potential cure accelerators or as curatives in the prior art, in the present invention they are preferably used as primary curing agents.

The amidine-based and amidoxime-based materials include monoamidines and monoamidoximes of the following formula (I) described further below. Preferred monoamidines and monoamidoximes may be represented by formula (I):

(I)

wherein Y may be a substituted alkyl, alkoxy, aryl, aralkyl or aralkoxy group or an unsubstituted or substituted fully or partially halogenated alkyl, alkoxy, aryl, aralkyl or aralkoxy group having from about 1 to about 22 carbon atoms. Y may also be, and preferably is, a perfluoroalkyl, perfluoroalkoxy, perfluoroaryl, perfluoroaralkyl or perfluoroaralkoxy group of from 1 to about 22 carbon atoms and more preferably a perfluoroalkyl or perfluoroalkoxy group of from about 1 to about 12 carbon atoms, and more preferably from 1 to 9 carbon atoms; and $R^1$ may be hydrogen or substituted or unsubstituted lower alkyl or alkoxy groups of from one to about 6 carbon atoms, oxygen (such that $NHR^1$ is a NOH group) or an amino group. $R^2$ may be independently any of the groups listed above for R1 or hydroxyl. Substituted groups for Y, $R^1$ or $R^2$ include, without limitation, halogenated alkyl, perhalogenated alkyl, halogenated alkoxy, perhalogenated alkoxy, thio, amine, imine, amide, imide, halogen, carboxyl, sulfonyl, hydroxyl, and the like. If $R^1$ and $R^2$ are both selected as oxygen and hydroxyl, such that there are two NOH groups on the compound (a dioxime can be used), and in that case, formula (I) can be further modified to accommodate a dioxime formula in which the carbon atom and the Y group together form an intervening aromatic ring and in which the NOH groups are located ortho-, para- or meta- to one another on the ring, such as with p-benzoquinonedioxime.

Preferred embodiments include those according to formula (I) in which $R^2$ is hydroxyl, hydrogen or substituted or unsubstituted alkyl or alkoxy groups of from 1 to 6 carbon atoms, more preferably hydroxyl or hydrogen. Also preferred are embodiments in which $R^1$ is hydrogen, oxygen, amino or a substituted or unsubstituted lower alkyl of from 1 to 6 carbon atoms while $R^2$ is hydrogen or hydroxyl. Most preferred are embodiments where $R^1$ and $R^2$ are both hydrogen. Further preferred embodiments include those in which Y is perfluoroalkyl, perfluoroalkoxy, substituted or unsubstituted aryl groups and substituted or unsubstituted halogenated aryl groups having the chain lengths as noted above, particularly preferred are when $R^1$ and $R^2$ are both hydrogen and Y is $CF_3(CF_2)_2$— (i.e., when the compound is heptafluorobutyrlamidine) or a similar amidoxime compound.

Exemplary monoamidine-based and monoamidoxime-based curatives according to formula (I) include perfluoroalkylamidines, arylamidines, perfluoroalkylamidoximes, arylamidoximes and perfluoroalkylamidrazones. Specific examples include perfluorooctanamidine, heptafluorobutyrylamidine, benzamidine, trifluoromethylbenzamidoxime, and trifluoromethoxylbenzamidoxime, with heptafluorobutyrlamidine being most preferred. Curatives as noted according to formula (I) may be used alone or in combinations, such as in combinations of preferred and/or exemplary compounds noted hereinabove or with secondary curatives.

The curatives according to formula (I) are preferably capable of curing perfluoroelastomeric compositions, particularly those with at least one cyano curesite monomer.

Other curative (curing agents) may include perfluoroelastomer formulations can include bisphenols and their derivatives, tetraphenyltin, triazine, peroxide-based curing systems (e.g., organic peroxides such as dialkyl peroxides), or combinations thereof. Other suitable curing agents include oganometallic compounds and the hydroxides thereof, especially organotin compounds, including ally-, propargyl-, triphenyl- and allenyl tin, curing agents containing amino groups such as diamines and diamine carbamates, such as N,N'-dicinnamylidene-1,6-hexanediamine, trimethylenediamine, cinnamylidene trimethylenediamine, cinnamylidene ethylenediamine, and cinnamylidene hexamethylenediamine, hexamethylenediamine carbamate, bis(4-aminocyclohexly)methane carbamate, 1,3-diaminopropane monocarbamate, ethylenediamine carbamate, trimethylenediamine carbamate, bisaminothiophenols, bisamidoximes, and bisamidrazones. Most preferably a peroxide cure system (including any necessary co-agents) is used.

The curing system does not require, but may also optionally include a variety of secondary curatives, such as bisphenyl-based curatives and their derivatives, tetraphenyltin, triazine, peroxide-based curing systems (e.g., organic peroxides such as dialkyl peroxides)(if not used as a primary agent or if used in a combination of peroxides, or combinations of these systems. Other suitable secondary curing agents include oganometallic compounds and the hydroxides thereof, especially organotin compounds, including ally-, propargyl-, triphenyl- and allenyl tin, curing agents containing amino groups such as diamines and diamine carbamates, such as N,N'-dicinnamylidene-1,6-hexanediamine, trimethylenediamine, cinnamylidene trimethylenediamine, cinnamylidene ethylenediamine, and cinnamylidene hexamethylenediamine, hexamethylenediamine carbamate, bis(4-aminocyclohexly)methane carbamate, 1,3-diaminopropane monocarbamate, ethylenediamine carbamate, trimethylenediamine carbamate, and bisaminothiophenols.

Other optional additives for use with the various perfluoroelastomer formulations can include the addition of fillers such as graphite, carbon black, clay, silicon dioxide, polymeric graphite, fluoropolymeric particulates (e.g., TFE homopolymer and copolymer micropowders), barium sulfate, silica, titanium dioxide, acid acceptors, cure accelerators, glass fibers, or polyaramid fiber such as Kevlar®, plasticizers, or other additives known or to be developed in the perfluoroelastomeric art. However, it is preferred for coating compositions used in semiconductor and other particulate-sensitive applications, that such optional fillers not be used, or that clean fillers (silica, barium sulfate or fluoropolymer particulates) be used.

The bonding agent, which bonds to the first and/or to the second surface (particularly for forming a weld-type connection), includes a curable perfluoropolymer and a curing agent. The components of the bonding agent may be individually dissolved and then combined followed by an in situ curing cycle. However, it is also within the scope of the invention to first compound the components and then dissolve the compound in a solvent. Methods of compounding bonding agent components may be according to any known technique in the art or any to be developed and a detailed explanation of the compounding and processing methods are not necessary for a complete understanding of the present invention. For example, conventional methods of compounding are described in International Plastics Handbook, $3^{rd}$ Edition, Saechtling, p. 54-55. However, it is preferred that the primary individual components are each first dissolved in a solvent(s) prior to combination.

In dissolving the components or formulation, the preferred solvent for dissolution of the curable perfluoropolymer is a fluorosolvent that is able to dissolve at least the curable perfluoropolymer component, and more preferably, that is able to also dissolve the curative(s). Solvents having the desired characteristics are known in the art and include Fluorinert® FC-87, FC-84, FC-75, FC-77 and/or FC-43, commercially available from 3M and any similar solvents. However, it should be understood that while such fluorinated solvents are preferred, any solvent which is known or to be developed, that is capable of dissolving the compounded curable perfluoropolymer, and preferably the curative and/or the primary components in the compounded perfluoroelastomer formulation (i.e., the perfluoropolymer and the curative aside from any additives) may be used within the scope of this invention.

Preferably the total amount of solvent to be used is about 70% to about 95% by weight, more preferably about 90% to about 95% by weight, and most preferably about 94% to about 95% by weight of the finished solution prior to cure.

The curable perfluoropolymer is preferably present in a finished solution in an amount about 1% to about 25% by weight, more preferably about 1% to about 10% by weight, and most preferably about 1% to about 5% by weight, based on the total weight of the finished solution. The curing agent is preferably present in an amount of about 0.01% to about 5%, more preferably about 0.01% to about 1.5%, and most preferably about 0.25% to about 1% based upon total weight of the finished solution prior to cure. It is preferred that the weight percentage ratio of perfluoropolymer to curing in the finished solution be about 30:1 to about 10:1, and more preferably about 20:1.

In making the finished solution, the bonding agent may be initially compounded to form a compounded bonding agent and then dissolved in solvent in accordance with the above preferred percentages. In such a method, the compounded flouropolymer might first be formed into small pieces by, for example, a clicker die, although any other die cutter, knife, scissor, or similar cutting apparatus suitable for the intended use can be used. Preferably the pieces range from about 0.010 inches to about 0.250 inches in size and more preferably about 0.030 inches on average. The pieces can optionally be ground into finer sized pieces. Preferably, the pieces are then added to a solvent, such as those mentioned above, and then mixed. Mixing the pieces in the presence of a solvent, for example on a ball mill, facilitates the dissolution of the perfluoropolymer formulation into the solvent.

More preferably, each of the primary components of the bonding agent is first dissolved in solvent. In such a method, a first solution (solution A) is formed by combining the curable perfluoropolymer with a solvent in an aFmount of about 2 to about 50% by weight curable perfluoropolymer, more preferably 2 to 20% by weight and most preferably 5 to 10% by weight based on the total weight of the first solution. A separate solution (solution B) is formed by combining the cure agents with a solvent in an amount of about 0.02% to about 10%, more preferably about 0.02% to about 3%, and most preferably about 0.50% to about 2% based on the total weight of the second solution. Then the two solutions are subsequently combined by taking equal parts of each solution and combining them to achieve the desired percentage of the curable perfluoropolymer and curative(s) in the finished solution. If additives are used, they may be added in either of the two initial solutions or in the finished solution in accordance with this particular method.

In an embodiment where the bonding agent is applied to the surface of a perfluoroelastomer member, the bonding agent of the present embodiment is made using the same or substantially the same perfluoroelastomer formulation as used to produce the rod stock to which it is to be welded. In the present embodiment, the bonding agent can include any of the compounded perfluoroelastomer formulations as described above, which include a curative(s).

Figure 1:
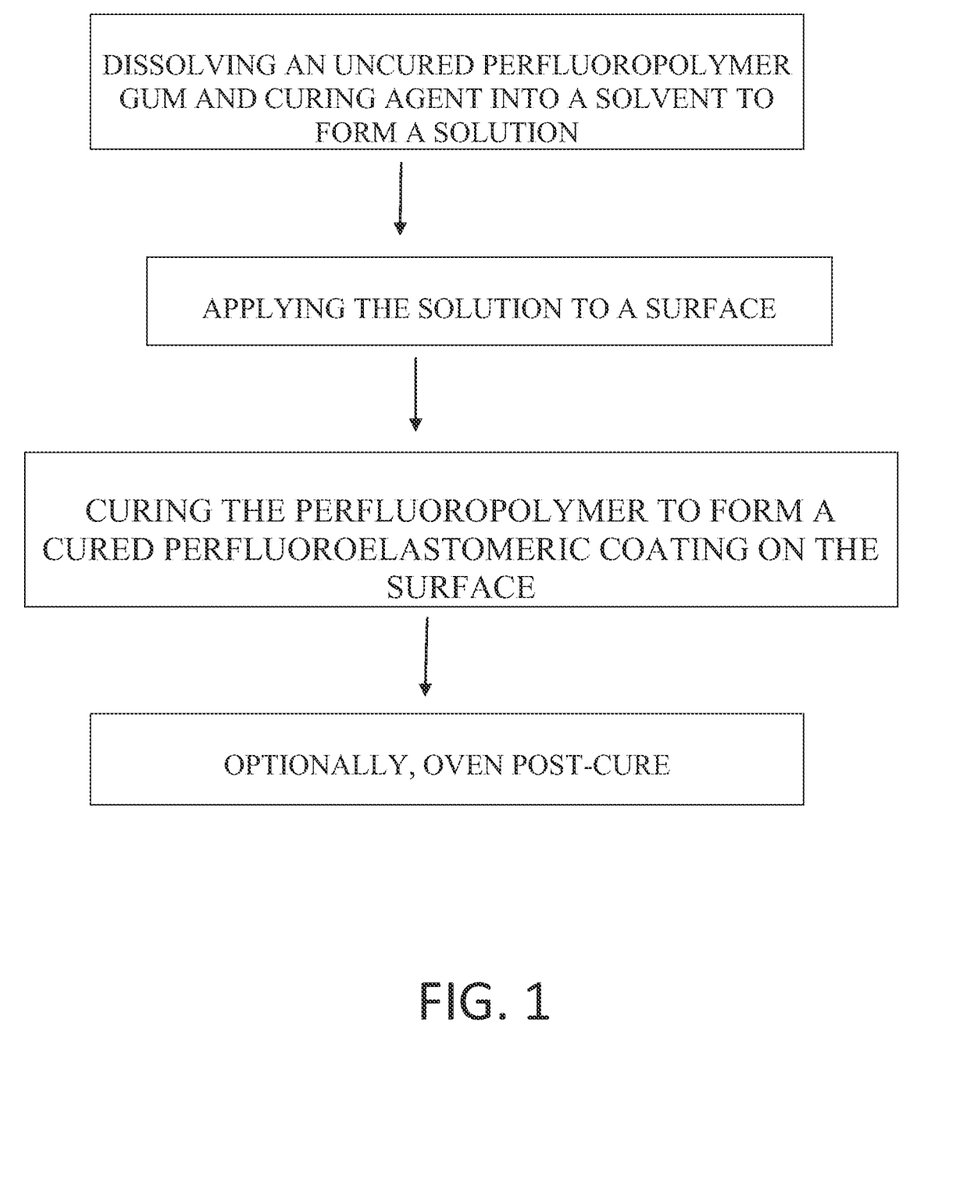
FIG. 1 is a flowchart of a method embodiment of forming a perfluoroelastomer coating.
Figure 2:
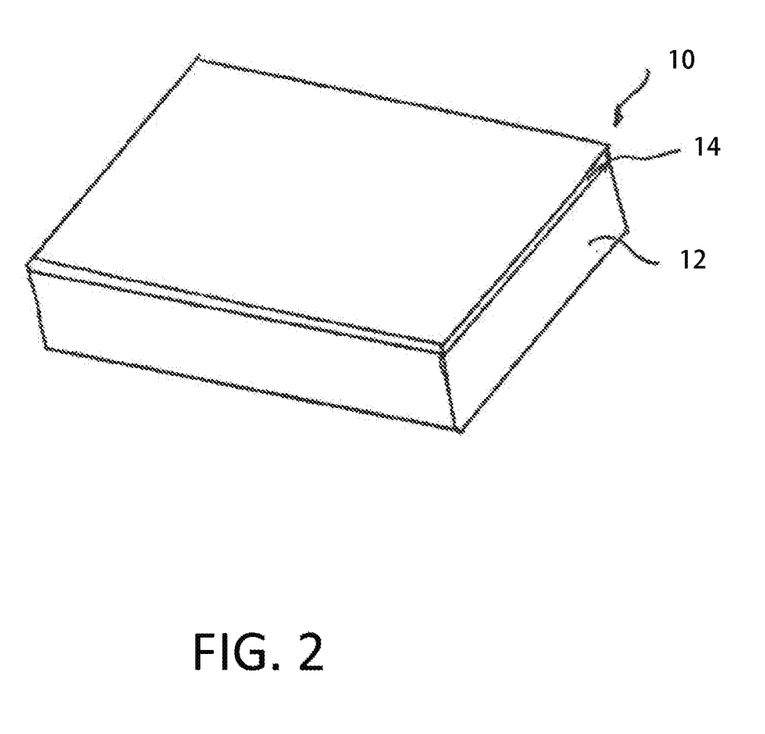
FIG. 2 is an enlarged perspective for cross-sectional view of a perfluoroelastomer coating made in accordance with an embodiment of the present invention.

In an embodiment, the invention includes a method of bonding a perfluoroelastomer material to a first surface by contacting a first surface with a bonding agent comprising a curable perfluoropolymer and a curing agent and curing the agent to form a perfluoroelastomer material that is bonded to the first surface such that the perfluoroelastomer material formed is a coating layer. In such embodiments, the bonding agent may be a solution that can be applied to a surface of a substrate by any number of conventional means such as spray coating, dip coating, brushing, layering, and the like. With reference to FIG. 2, a coated substrate, generally referred to as 10, is formed by applying the finished solution to an uncoated substrate 12. Once the bonding agent solution is applied, it is cured in situ to form a coating 14. Once the substrate is coated a heat cycle is applied. The heat cycle will vary depending upon the specific perfluoroelastomer formulation used for the curing agent, however the heat cycle can be configured to provide a sufficient amount of heat for a sufficient amount of time to effectively cure the bonding agent. Alternative curing can be used including ultraviolet, infrared or other radiative curing methods as well as optional use of pressure. While the invention should not be restricted to any specific cure or cure cycle, it is preferred that heat is used at about 149° C. (300° F.) for about eight minutes. However, the curing temperature will vary depending upon the type of perfluoropolymer and curing agent used in the perfluoroelastomer formulation. Such curing temperatures can range from about 138° C. (280° F.) to about 177° C. (350° F.), and preferably about 149° C. (300° F.) to about 177° C. (350° F.). One of ordinary skill in the art will understand that curing conditions vary with elastomer systems and that such temperature ranges are not intended to be limiting with respect to the scope of the invention, since a variety of perfluoroelastomer formulations can be used.

After heat curing, post curing may optionally, but not necessarily be applied at about 180° C. (356° F.) or other suitable post-cure temperature for about seven to eight hours or other suitable cure cycle times, depending on the resulting properties desired. An additional cool down time of one hour can then optionally be applied.

Although the present embodiment has been described for coating a single substrate, the process may also be used to bond two substrates together as an adhesive or bonded layer formed in situ between two opposing surfaces (not shown) such as in a laminated or other multi-layered structure. It may also be used to bond on three-dimensional, non-planar surfaces.

The application of the present embodiment is not limited to any particular substrate surface type, but instead can be used to form a perfluoroelastomer coating on any type of solid surface. Such perfluoroelastomer coatings can be used to coat foamed materials, metals, metal alloys, glass, elastomers, plastics, composites and the like. As a result of the uniquely elastomeric and inert character of such coatings, they have application in a wide variety of areas, including, semiconductor processing parts, doors, and equipment; surface passivation; handling or mechanical tools; medical equipment and devices; automotive and aerospace parts and surfaces, equipment subject to high corrosion (e.g., oil field and catalytic process equipment) and the like. In addition, the coatings as formed are highly chemically inert and insoluble.

The coatings may also be used to affect a seal in applications in which the features are too small for conventional molded seal parts, such as in "lab-on-a-chip" applications in which a very thin silica or plastic layer must be sealed with a heat- and chemically-resistant material. The material coatings may also be used as sealants on metal surfaces such as those in aircraft engine parts where in-service use conditions exceed the temperature range for other elastomers such as nitriles or standard fluoroelastomers (such as Viton®).

When pressures or temperatures exceed the capabilities of typical elastomer seals, there are current uses involving metal-to-metal seals. However, these seals must be highly polished to affect a seal. It substantially increases the cost of forming such seals. However, application of a thin coating as described herein on such a substrate can affect a seal between metal parts using a less polished and less expensive metal surface.

Such solutions and cured coatings can also be used to repair or adhere to surfaces of expensive perfluoroelastomer molded parts (such as O-rings, seals, gaskets and the like).

Figure 6:
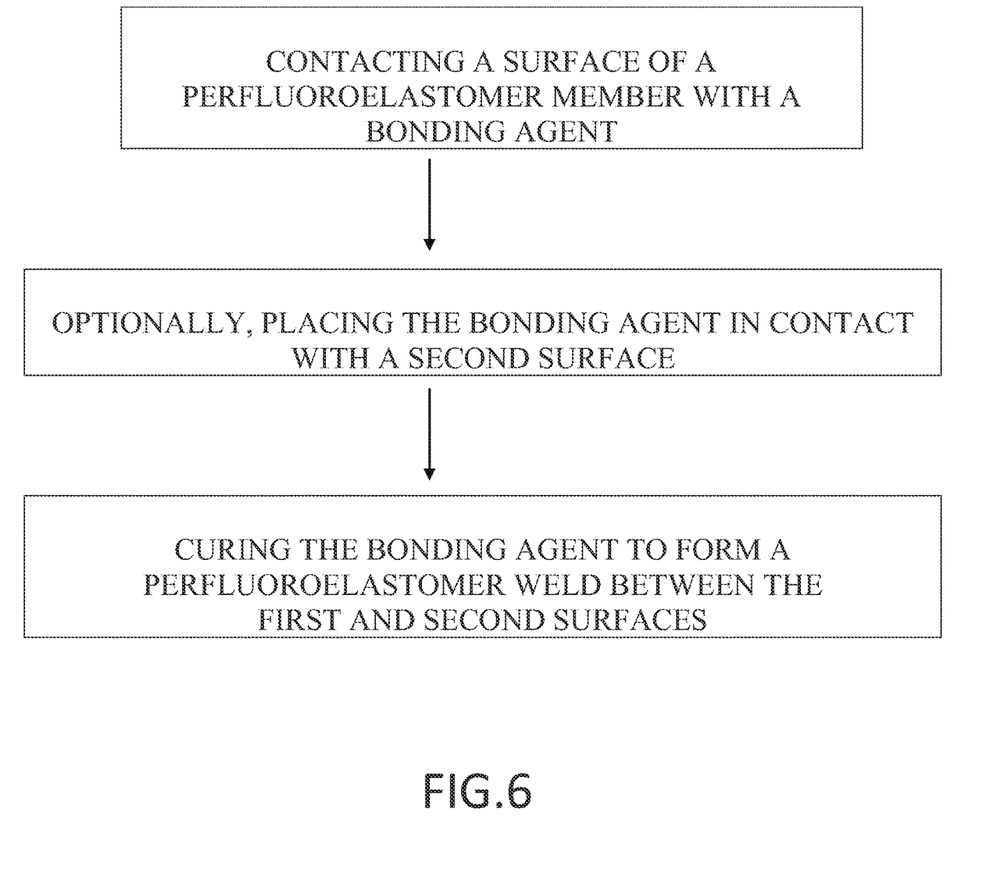
FIG. 6 is a flowchart of a method of bonding a perfluoroelastomer.

In an embodiment, the present invention provides for a method (as illustrated in FIG. 6) of bonding perfluoroelastomer ("FFKM") members, for example to form a seal (e.g., an O-ring or similar shaped seal) out of rod stock. The term "rod stock" as used herein means any preformed stock material, regardless of shape or cross-sectional configuration that can be used to make a seal.

The rod stock 11, 20 (FIGS. 3a and 3b) is pre-formed using any conventional molding process such as extrusion or compression molding. Such molding processes are well known in the art and a detailed explanation of them is not necessary for a complete understanding of the present invention. During the pre-form process, which is typically extrusion, some heat applied to the mold at least partially cures the compounded perfluoroelastomer formulation transforming the perfluoropolymer into at least partially cured perfluoroelastomer. The remaining curing typically occurs during post pre-form processes, such as press-molding or oven post-cure.

Figures 3A, 3B, 4, 4A:
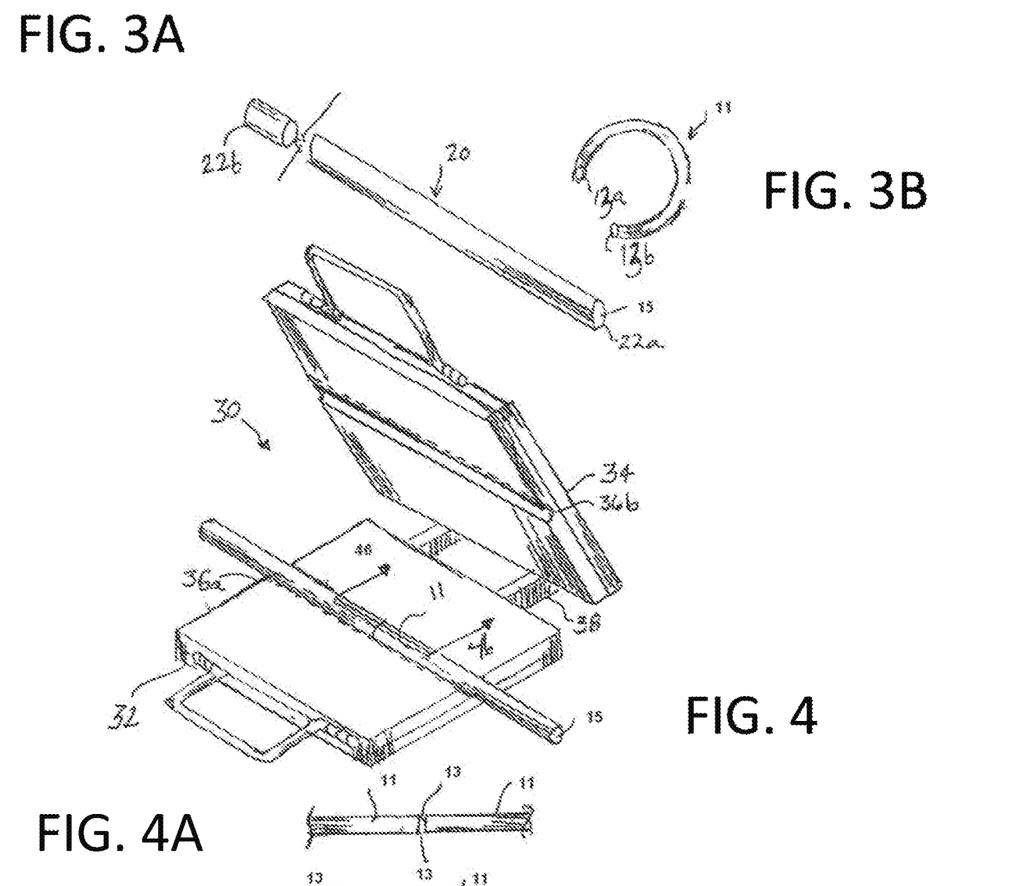
Figure 4B:
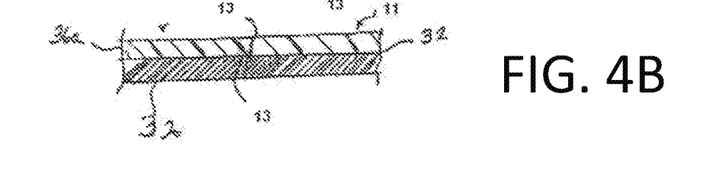
FIG. 4b is a partial cross-sectional view of the rod stock material in FIG. 4a taken along line 4b-4b in FIG. 4.

With reference to FIGS. 3a and 3b, the perfluoroelastomer pre-form or rod stock 11, 20 (as illustrated in FIGS. 3a and 3b) is initially formed from a compounded perfluoroelastomer formulation. Preferably the perfluoroelastomer rod stock 11, 20 is at least about 25% to about 95% cured. Methods of compounding perfluoroelastomer formulations may be according to any known technique in the art or any to be developed and a detailed explanation of the compounding and processing methods are not necessary for a complete understanding of the present invention. For example, conventional methods of compounding are described in International Plastics Handbook, $3^{rd}$ Edition, Saechtling, p. 54-55, the contents of which are incorporated herein.

The rod stock 11 has a first end 13a with a preferred cross-sectional surface 15 in a shape which is generally circular. The cross-sectional shape can alternatively be any other shape consistent with the intended use such as an oval, square, rectangle, or the like. The rod stock 11 also has a second end 13b with a cross-sectional surface 15 with a generally circular shape.

As used herein, the term "weld" is meant to broadly encompass any joining together of two surfaces through use of a bonding agent therebetween, whether in liquid or solid "plug" form, physically and preferably using curable chemical crosslinking and/or bonding between each of the two opposing surfaces to be welded and the bonding agent, however, it should be understood that the two opposing surfaces need not be formed of the same material. The first end 13a of the rod stock 11 can be welded to the second end 13b of rod stock 11 to form a circular ring. Alternatively, the first end 13a can be welded to a second rod stock 20 having ends 22a, 22b (as shown in FIG. 3a) which can be formed from the same perfluoroelastomer formulation as rod stock 11. The weld for joining various ends of perfluoroelastomer rod stock is formed by coating or applying at least one end of the rod stock with a bonding agent.

The bonding agent, either in the form of an extruded preform of the perfluoroelastomer formulation to form a solid "plug" or in the form of a solution of the compounded perfluoroelastomer formulation is employed. As a solution, it is applied to the surface of the rod stock 11. The bonding agent is then contacted with at least one of the surfaces to be welded. It can be applied in liquid form as a coating to a single surface such as 13a, or both opposing surfaces, such as 13a, 13b or 22a, 22b, that are to be welded together. As a solid "plug," it can be merely inserted between two surfaces to be welded in a manner such that the plug will contact the surfaces upon later curing and processing. As a plug, the preform is situated next to, for example, a rod stock 11 surface, preferably contacting the surface.

In operation, when using a bonding agent in solution to weld two ends of perfluoroelastomer rod stock together, for example to form an O-ring, at least one surface of one of the ends e.g., 13a is initially coated with the bonding agent. The coating can be applied by any number of conventional means such as spray coating, dip coating, brushing, layering, and the like. The second end 13b of the rod stock 11 may also optionally be coated with the bonding agent when welding two ends of the same rod stock. The two ends of the coated rod stock 13 are then placed in a fixture 30 (e.g., a splicing fixture as shown in FIG. 4) to secure one end 13a adjacent to or in contact with the second end 13b of the rod stock 10 (as shown in FIG. 4a). The fixture 30 can be configured to accommodate the rod stock 11 for size and alignment and to allow heat and pressure to be exerted on the rod stock 11 to hold them in place within the fixture 30. The heat and pressure are generally supplied by a press, in which the fixture is mounted and operated. The fixture 30 can optionally act to apply a heat cure cycle to the bonding agent.

The fixture 30 includes a bottom portion 32 and a top portion 34. The top 34 and bottom 32 portions include channels 36a, 36b respectively for seating the rod stock material. A hinge 38 connects the top 34 and bottom 32 portions to allow the fixture 30 to open and close and to align the top and bottom portions of the channel 36a, 36b.

After placing the coated rod stock 10 in the fixture 30, the fixture 30 is closed and a heat cycle is applied. The heat cycle will vary depending upon the specific perfluoroelastomer formulation used for the curing agent, however the heat cycle can be configured to provide a sufficient amount of heat for a sufficient amount of time to effectively cure the bonding agent. An effectively cured bonding agent is one that results in at least a partially cured perfluoroelastomer (preferably one which is cured greater than about 75%). The bonding agent is typically cured about 75% to about 95%, or up to about 99%. In the present embodiment, the heat cycle includes heat of about 300° F. for about 8 minutes. However, the curing temperature of the heat cycle will vary depending upon the type of perfluoropolymer and curing agent used in the perfluoroelastomer formulation and emeplay temperatures are detailed above in the coatings context. One of ordinary skill in the art will understand that curing conditions vary with elastomer systems and that such temperature ranges are not intended to be limiting with respect to the scope of the invention, since a variety of perfluoroelastomer formulations can be used.

This heat cycle contributes to substantially if not fully completing the cure reaction of the perfluoropolymer and curing agent(s) within the bonding agent that subsequently results in the same or substantially the same perfluoroelastomer as the perfluoroelastomer of the rod stock. After the heat cycle, the spliced ends can be post cured at about 180° C. (356° F.) or other suitable post-cure temperature for about seven to eight hours or other suitable cure cycle times. An additional cool down time of one hour can then optionally be applied. Preferably the bonding agent forming the perfluoroelastomer splice is cured to about 95% as noted above. In addition to heat cure cycles, it is also within the scope of the invention to use infrared, UV, or other radiative curing techniques.

This welding process can be applied to a variety of rods having multiple ends to form a variety of sealing rings of varying sizes, shapes, and configurations. The resulting seals, which can be very large in size, have a cured, indistinguishable, and homogenous weld(s) compared to seals wholly formed from a single-step mold operation. That is, the perfluoroelastomer weld has the same or substantially the same chemical composition as the perfluoroelastomer rod stock. This advantageously results in the seal having the same highly resistant chemical composition throughout. Thus, there are no weak points or welded ends that are more vulnerable to chemical and/or physical attack than the rod stock bulk seal material.

Although the present embodiment has been described for bonding two surfaces of the same rod stock or two different pieces of rod stock made from the same perfluoroelastomer, the present invention is not limited to bonding such materials only. The present invention can also be used to weld two different pieces of rod stock made from different perfluoroelastomers, such as any of the perfluoroelastomers described above. Further, the invention can be used to bond or weld various other types of perfluoroelastomers surfaces not in rod form—in sheet form, molded form, lamination form and various other shapes.

Figure 5:
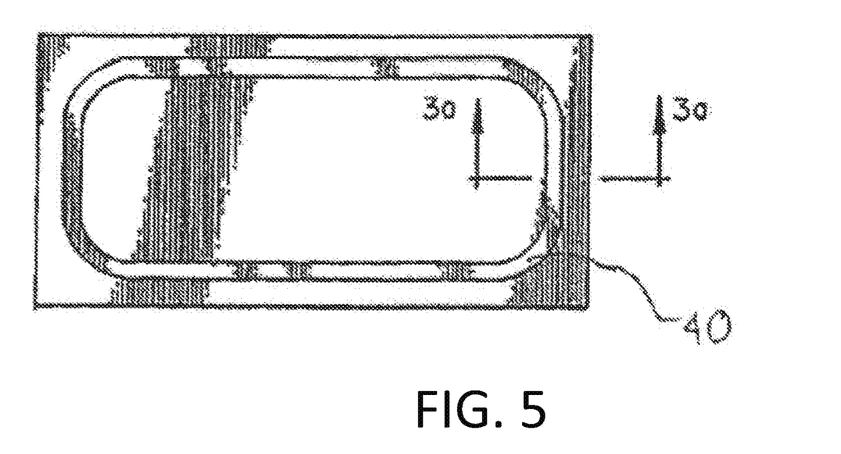
FIG. 5 is a plan view of a perfluoroelastomer seal within a gland.
Figure 5A:
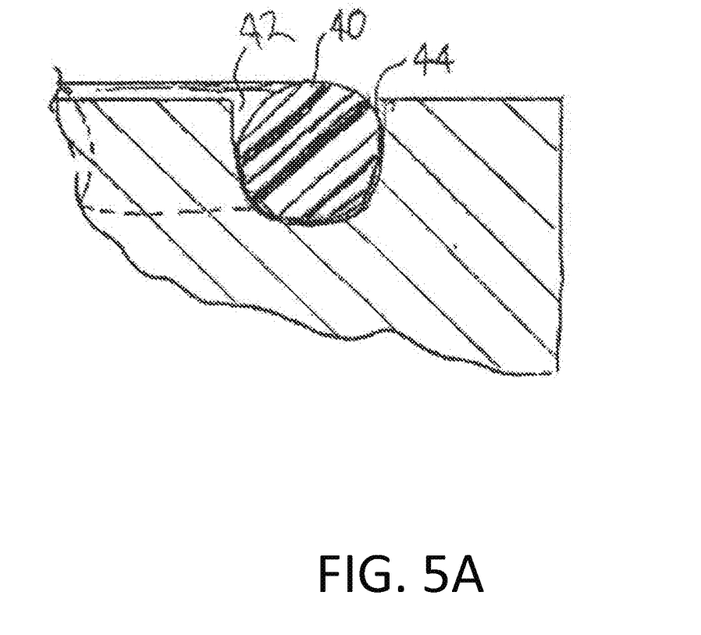
FIG. 5a is a cross-sectional view of the perfluoroelastomer seal of FIG. 5.
Figure 7:
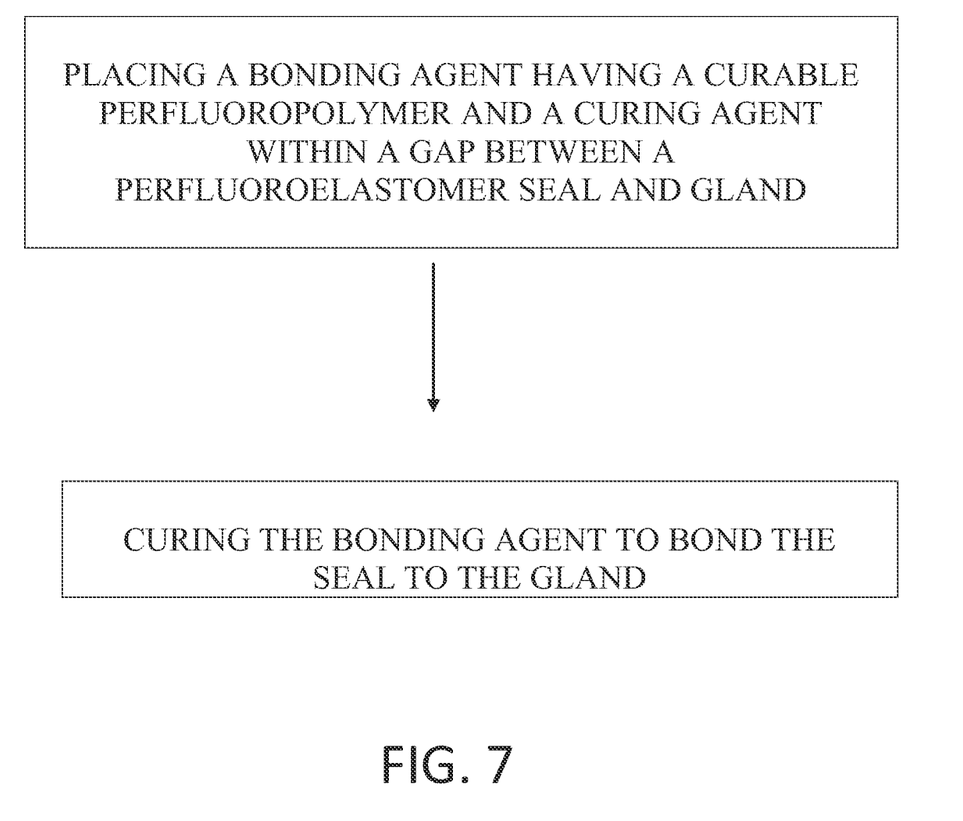
FIG. 7 is a flowchart of a method of bonding a perfluoroelastomer seal to a gland.

In another embodiment, the present invention provides for a method of potting a perfluoroelastomer seal 40 as illustrated in FIGS. 5 and 7 using a bonding agent as described in any of the above embodiments. As used herein and shown in FIG. 5a, the term "potting" means filling in of gaps 42 or spaces between a seal 40 and a seal gland 44. The seal gland 44 is typically formed from materials that are highly resistant to chemical attack such as aluminum and stainless steel. In this embodiment, the bonding agent is placed within the gaps 42 between the seal 40 and the seal gland 44. After potting the bonding agent, the entire construct i.e., the seal 40, seal gland 44, and potted bonding agent, is heated to about 149° C. (300° F.) for about eight minutes. The heat cures the bonding agent and as a result forms a perfluoroelastomer bond between the seal 40 and the seal gland 44. An advantage of the present embodiment is that the perfluoroelastomer seal 40 then is securely bonded to the seal gland 44 which advantageously lowers particulation or degradation of the primary sealing material due to the additional perfluoroelastomer from the weld and because there is then minimized gapping between the seal 40 and the gland through which particulation may migrate. In addition, the bond eliminates the relative motion and hence abrasion, between the seal and gland, further contributing to lower particulation.

The application of the present embodiment is not limited to potting such as seal against a gland having any particular composition, but instead can be used to pot a perfluoroelastomer seal on a variety of gland surfaces, for example, formed of metals, metal alloys, plastics, composites and the like. However, metallic and metallic alloy surfaces are most typically encountered in such applications of use. Such potting uses can be used in various bonded gland applications, including, semiconductor doors, gates, and other pre-bonded surface sealing applications, and are particularly useful when such applications are subject to high corrosion such as semiconductor manufacturing conditions.

Example 1

In this example, a large perfluoroelastomer seal was made using Chemraz® molded subsections which had been cured, but not post-cured. One section was rectangular in configuration, wherein the rectangle had rounded corners. Two other circular sections were prepared. The rectangular section was sliced transversely across the long-sided portions of the rectangle. After cutting, two half-rectangular end pieces were formed. The circular sections were then sliced so as to form a rod, and shortened to the appropriate length to form two straight sections of desired length. The resultant two rectangular end pieces were joined to the two straight sections using a bonding agent and a splicing fixture to form a resultant part having the shape shown in FIG. 8.

The bonding agent used was prepared by first compounding a perfluoroelastomer formulation having the following constituents, as noted in parts by weight:

| Components | Parts by Weight |
| --- | --- |
| Curable Perfluoropolymer | 100 |
| Silica | 9 |
| Peroxide-Based Curing Agent | 1.5 |
| Peroxide-Based Cure System Co-Agent | 4 |
| Barium Sulfate | 32 |

After compounding, the compounded formulation was cut into small pieces, approximately 0.25 inches in size in the largest dimension using a die cutter. The pieces were then added to a jar having Fluorinert® FC-77 solvent. The solvent was added so as to make-up 94% by weight of the total solution. The jar was then placed on a jar mill and continuously rolled for about forty-eight hours to form the bonding agent.

Figure 8:
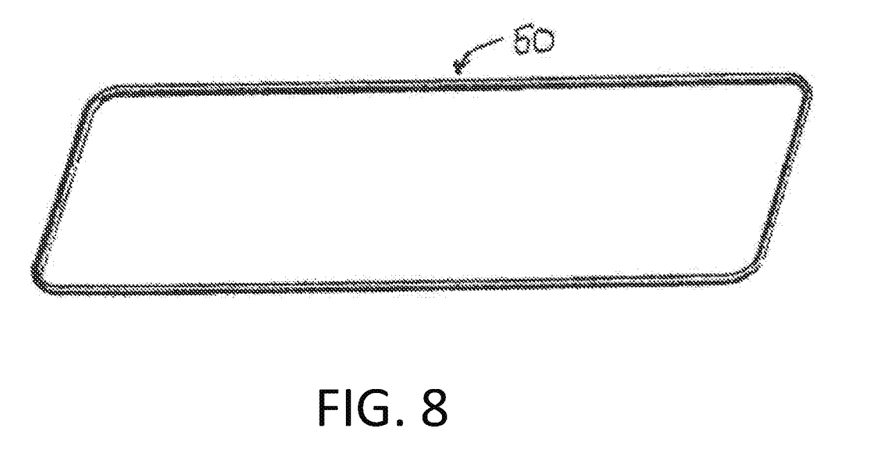
FIG. 8 is large perfluoroelastomer seal made in accordance with an embodiment of the present invention.

The bonding agent was coated on one end of a first rod stock member and placed within a sealing fixture such as that shown in FIG. 4, to be welded to a second rod stock member. The second rod stock member was also coated and placed so that its end was pressed against the coated end of the first rod stock member. The sealing fixture was then closed and heated to about 149° C. (300° F.) for about eight minutes to cure the bonding agent. This welding process was performed four times at each desired weld to form the finished part and to create the welds to form a large-formed seal. The overall rectangular dimensions of the finished part as shown in FIG. 8 were approximately 2.1 meters long× 0.17 m wide with a transverse cross-sectional diameter (being generally circular in transverse configuration) of about 0.6 cm (the shape formed at the weld was not perfectly round, but was very close). The part was then post-cured at 180° C. (356° F.) for 7.25 hours followed by a one hour cool down period.

Example 2

A perfluoroelastomer coating was made by forming a first solution (Solution A). Solution A was formed by dissolving 100 parts by weight of a curable cyano-curable perfluoropolymer prepared in accordance with WO 00/08076 (a perfluoroelastomer gum having a primary and secondary cyano curesite) in 900 parts by weight of Fluorinert® FC-43 fluid solvent from 3M. A second solution (Solution B) was made by dissolving 5 parts by weight of heptafluorobutyrlamidine as a curing agent in 995 parts by weight of the same solvent used to form Solution A. Solutions A and B were then combined in equal parts by weight to form a finished coating solution. The finished coating solution was applied on a metallic substrate surface and subjected to a heat curing cycle of 100° C. (212° F.) for about four hours. The resulting cured perfluoroelastomer coating was clear. Similar coatings were also prepared on glass, plastic and synthetic rubber.

What is claimed is:

1. A method of forming a perfluoroelastomer coating comprising (a) dissolving a curable perfluoropolymer, having at least one curesite monomer comprising a cyano group, and a curing agent in a solvent to form a solution, (b) applying the solution to a surface; and (c) curing the perfluoropolymer to form a cured perfluoroelastomeric coating on the surface, wherein step (c) comprises heating the coating layer for a sufficient period of time to effectively cure the perfluoropolymer, further wherein the curing agent is selected from the group consisting of a monoamidine, a monoamidoxime and an aryldioxime.

2. The method according to claim 1, wherein the curing step further comprises heating the coating layer to about 149° C. (300° F.).

3. The method according to claim 1, wherein step (a) further comprises (i) forming a first solution of the curable perfluoropolymer and a first solvent; (ii) forming a second solution of the curing agent and a second solvent; and (iii) combining the first solution and the second solution.

4. The method according to claim 3, wherein the first solvent and the second solvent are identical.

5. The method according to claim 1, wherein step (b) comprises spraying the solution onto the surface.

6. The method according to claim 1, wherein the curing agent is perfluorooctanaidine or heptafluorobutyrlamidine.

7. The method according to claim 1, wherein the solution comprises about 1% to about 25% by weight of the perfluoropolymer based on the total weight of the solution.

8. The method according to claim 7, wherein the solution comprises about 1% to about 10% by weight of the perfluoropolymer based on the total weight of the solution.

9. The method according to claim 8, wherein the solution comprises about 1% to about 5% by weight of the perfluoropolymer based on the total weight of the solution.

10. The method according to claim 9, wherein the solution comprises about 0.01% to about 5% by weight of the curing agent, based on the total weight of the solution.

11. The method according to claim 10, wherein the solution comprises about 0.01% to about 1.5% by weight of the curing agent based on the total weight of the solution.

12. The method according to claim 11, wherein the solution comprises about 0.25% to about 1% by weight of the curing agent based upon total weight of the solution.

* * * * *